US009435416B2

(12) United States Patent
Nassim (10) Patent No.: US 9,435,416 B2
(45) Date of Patent: Sep. 6, 2016

(54) ROTARY DRIVE TRANSMISSION

(76) Inventor: Michael Nassim, Leicestershire (GB)

( * ) Notice: Subject to any disclaimer, the term of this patent is extended or adjusted under 35 U.S.C. 154(b) by 2540 days.

(21) Appl. No.: 10/556,883

(22) PCT Filed: May 17, 2004

(86) PCT No.: PCT/GB2004/002137
§ 371 (c)(1),
(2), (4) Date: Oct. 30, 2006

(87) PCT Pub. No.: WO2004/102038
PCT Pub. Date: Nov. 25, 2004

(65) Prior Publication Data
US 2007/0142154 A1    Jun. 21, 2007

(30) Foreign Application Priority Data
May 16, 2003  (GB) .................................. 0311238.0

(51) Int. Cl.
*F16H 37/08*    (2006.01)
(52) U.S. Cl.
CPC .................. *F16H 37/086* (2013.01)
(58) Field of Classification Search
CPC ...................................................... F16H 37/086
USPC .............................. 476/40, 46; 475/214–218
See application file for complete search history.

(56) References Cited

U.S. PATENT DOCUMENTS

| 2,060,884 A | 11/1936 | Madle |
| 2,152,796 A | 4/1939 | Erban |
| 2,164,504 A | 7/1939 | Dodge |

(Continued)

FOREIGN PATENT DOCUMENTS

| BE | 496 687 | 10/1950 |
| DE | 100 21 912 A1 | 8/2001 |

(Continued)

OTHER PUBLICATIONS

International Search Report, dated Aug. 31, 2004.
Notice of Reasons for Rejection, App. No. 2006-530512, dated Feb. 23, 2010.

*Primary Examiner* — William C Joyce
(74) *Attorney, Agent, or Firm* — Blank Rome LLP (57) ABSTRACT

A rotary drive transmission having a rotary drive input (20) and a rotary driven output (30), the drive transmission being capable of selectively varying the drive ratio between the rotary drive input (20) and rotary driven output (30), the drive transmission including a main drive shaft defining the rotary drive input (20), a differential transmission assembly (40) having a rotary output member (30) which defines said rotary driven output (30), the differential assembly (40) including a first rotary drive input (I1) and a separate second rotary drive input (I2), the first (I1) and second rotary drive (I2) inputs and said rotary driven output (30) member being drivingly interconnected with one another such that changes in the relative rotation of the first (I1) and second rotary drive (I2) inputs causes a rotational change in said rotary output member (30), and selectively operable rotary adjustment means (53, 56) for adjusting the rotation of the second rotary drive input (I2) for selectively controlling rotation of the rotary output member (30), the differential assembly (40) and the adjustment means (53, 56) each being mounted on the main drive shaft such that said first rotary drive input (I1) and the rotary adjustment means (53, 56) are directly driven thereby.

9 Claims, 11 Drawing Sheets

(56) References Cited

U.S. PATENT DOCUMENTS

| | | |
|---|---|---|
| 2,716,357 A | 8/1955 | Rennerfelt |
| 3,299,744 A | 1/1967 | Kraus |
| 3,822,610 A | 7/1974 | Erban |
| 2002/0045511 A1* | 4/2002 | Geiberger et al. ............ 475/216 |

FOREIGN PATENT DOCUMENTS

| | | |
|---|---|---|
| EP | 1026424 | 8/2000 |
| FR | 2807811 | 10/2001 |
| JP | 03 223555 | 10/1991 |
| JP | 2002168309 A | 6/2002 |

* cited by examiner

ROTARY DRIVE TRANSMISSION

FIELD OF THE INVENTION

The present invention relates to an infinitely variable transmission.

BACKGROUND

Infinitely variable transmissions are known for transmitting rotary motion from a rotary drive source to a rotary driven load such that the speed of rotation of the load may be selectively varied in a continuous and variable manner for a given rotary speed of the rotary drive source.

In use, such transmissions have a wide range of applications; for example such transmissions may be used in applications where the rotary drive source delivers a variable rotary drive such as in road vehicles wherein the transmission transmits rotational drive from an engine to the road wheels of the vehicle; alternatively such transmissions may be used in applications where the rotary drive source delivers a constant rotary drive such as in a machine tool lathe application wherein the transmission delivers a constant rotary drive from an electric motor to the chuck of the lathe.

Infinitely variable transmissions of the type disclosed in French patent application No. FR 0004842, published as FR2807811 (referred to throughout as such), are known wherein the transmission includes and epicyclic gear assembly having a rotary drive output for connection to a load to be driven and a rotary drive input for connection to a rotary drive source, the rotary drive input being arranged to drive the epicyclic gear assembly via first and second drive inputs driven by said rotary drive input, the first drive input being drivingly connected to said rotary drive input via a variator which is selectively operable to vary the relative rotational speeds of the first and second drive inputs and thereby cause a desired rotational change in said rotary drive outputs.

Infinitely variable transmissions of the type disclosed in FR2807811 tend to suffer from certain disadvantages. For example, the transmission is relatively complex and so is relatively expensive to produce. It is also generally bulky and requires a relatively large amount of occupancy space when installed in a drive system. Also the arrangement of components making up the variable transmission makes it difficult to easily change the drive ratios and/or torque transmission capabilities of the variable transmission when tailoring the variable transmission for a particular application.

SUMMARY

A general aim of the present invention is to provide a variable transmission of the type disclosed in FR2807811 but which is less complex, is more compact and is more versatile to enable drive ratios and/or torque transmission capabilities to be more easily made for tailoring the variable transmission for a particular application.

According to one aspect of the present invention there is provided a rotary drive transmission having a rotary drive input and a rotary driven output, the drive transmission being capable of selectively varying the drive ratio between the rotary drive input and rotary driven output, the drive transmission including a main drive shaft defining the rotary drive input, a differential transmission assembly having a rotary output member which defines said rotary driven output, the differential assembly including first rotary drive input and a separate second rotary drive input drivingly interconnected with the rotary driven output member such that changes in the relative rotation of the first and second rotary drive inputs causes a rotational change in said rotary output member, and selectively operable rotary adjustment means for adjusting the rotation of the second rotary drive input for selectively controlling rotation of the rotary output member, the differential assembly and the adjustment means each being mounted on the main drive shaft such that said first rotary drive input and the rotary adjustment means are directly driven thereby.

BRIEF DESCRIPTION OF THE DRAWINGS

Various aspects of the present invention are hereinafter described with reference to the accompanying drawings, in which.

DETAILED DESCRIPTION

Figure 1:
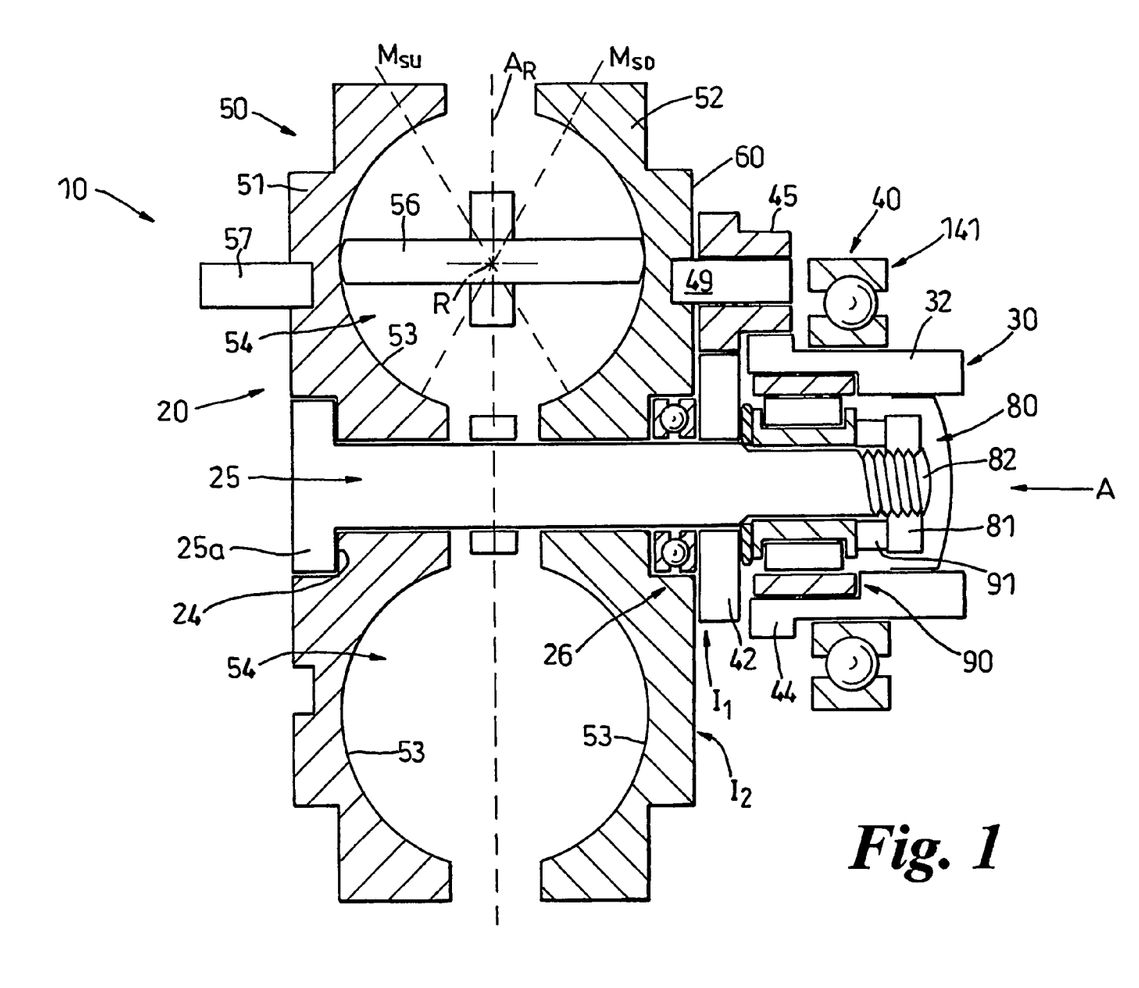
FIG. 1 is a schematic axial section through a variable transmission according to a first embodiment of the present invention.
Figure 1A:
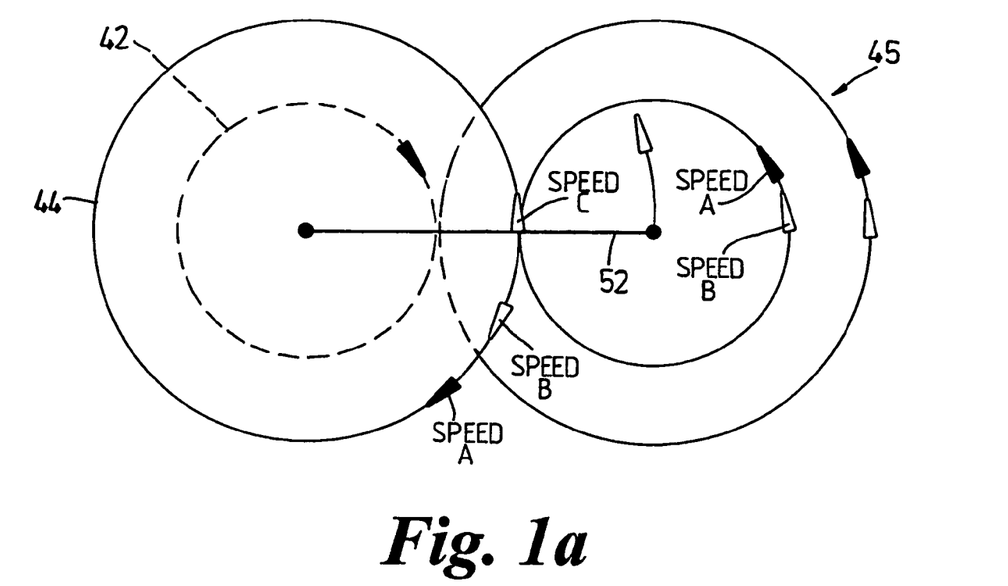
FIG. 1a is a schematic axial end view of the embodiment of FIG. 1 as viewed from arrow A.

The first embodiment 10 illustrated in FIGS. 1 and 1a includes a rotary drive input 20 and a rotary driven output 30 which is driven by the rotary drive input 20 via an epicyclic gear assembly 40 and variator 50. In use, the rotary drive input 20 is drivingly connected to a rotary drive source (not shown) such as an electric or fluid motor or an engine and the rotary driven output 30 is drivingly connected to a load which is to be rotationally driven. For example in a road vehicle application, the rotary drive source would be an internal combustion engine and the load would be one or more of the vehicle's road wheels.

Figure 5:
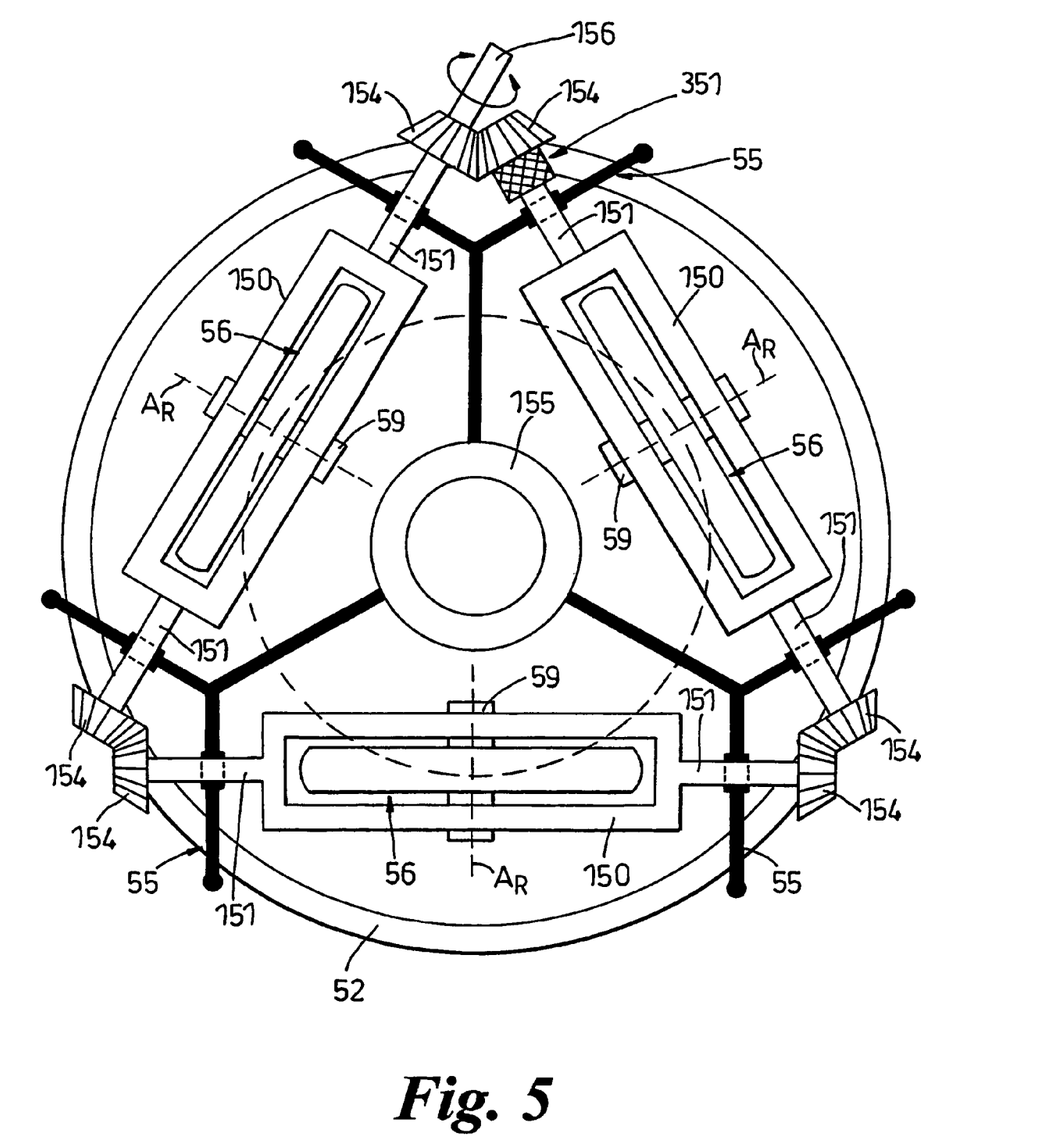
FIG. 5 is a schematic axial end view of the variator used in the embodiments of FIGS. 1 to 4.

The variator 50 includes a pair of axially opposed housing discs 51, 52. The axially opposed sides of the housing discs 51, 52 each include an annular channel 53 which in the illustrated embodiment is semi-circular in cross-section. The annular channels 53 have a common radial centre R and together define an annular chamber 54. Housed within the annular chamber 54 are a plurality of wheels 56 which are preferably rotatably mounted on a common frame 55 (FIG. 5). Each wheel 56 rotatably engages both opposed channels 53 and has an axis of rotation $A_R$ which is angularly adjustable about the radial centre R whilst being constrained to move within a plane containing the axis of rotation of the housing discs 51, 52. As illustrated in FIG. 5, three wheels 56 may be provided. Each wheel 56 rotates about an axle 59 mounted on a bracket 150. Each bracket 150 has co-axial shaft extensions 151 rotatably mounted on the frame 55 so that the bracket 150 is rotatable about an axis of rotation passing through centre point R. The shaft extensions 151 of each bracket 150 are each provided with meshing bevel gears 154 such that all brackets 150 rotate in unison about the axis of rotation of their shaft extensions in order to adjust the angular position of the wheels 56. One of the shaft extensions 151 is connected to a rotary drive means (not shown) via a stub shaft 156 to enable variable angular adjustment of the brackets 150 and wheels 56 carried thereby. Preferably a resilient torque adjuster 351 is provided which maintains a predetermined amount of torque for rotatably driving shafts 151 to thereby eliminate back lash between the bevel gears 154. Torque adjuster 351 maybe a coiled spring.

Preferably the frame 55 is fixed to a surrounding housing (not shown) to maintain it static. Preferably the frame 55 carries a bearing or bush sleeve 155 which rotatably supports shaft 25.

Housing disc 51 is drivingly connected to a drive source (not shown) which may for example be the flywheel of an internal combustion engine. The drive connection may be achieved by a plurality of dowels 57. In FIG. 1, housing disc 51 constitutes the rotary drive input 20. A main drive shaft 25 co-axially extends from the housing disc 51. The shaft 25 has an enlarged section 25a having splines interengaged with splines in the disc 51. Accordingly, disc 51 and shaft 25 rotate in unison.

The housing disc 52 is rotatably mounted on the shaft 25 by a thrust bearing 26.

Accordingly rotation of housing disc 51 in a given direction causes wheels 56 to rotate and in turn cause the housing disc 52 to rotate in the opposite direction to that of disc 51. The relative speed of rotation of discs 51, 52 is dependent upon the angular position of the axis of rotation of the wheels 56 about radial centre R. For example each wheel 56 may be angularly adjusted to provide a variable change in ratio between a maximum step-up in ratio (as indicated by position $M_{SU}$) and a maximum step-down in ratio (as indicated by position $M_{SD}$).

In the illustrated embodiment, the cross-sectional shape of each channel 53 is semi-circular. Accordingly, the surface to surface loading between each wheel 56 and the surfaces of the opposed channels 53 with which the wheel engages is the same throughout the range of angular adjustment of the wheel 56 about centre point R. It is appreciated that the amount of load which the wheel 56 needs to transmit will vary depending upon its angular position about centre point R viz. for a given rotational speed of housing disc 51 each wheel will need to transmit a maximum load when the wheel is at its limits $M_{SU}$, $M_{SD}$ of angular adjustment and a minimum load when at a central point between these limits. Accordingly it is envisaged that the cross-sectional shape of one or both of the opposed channels 53 may be hyperbolic or parabolic such that the contact pressure between the engaged surface of each wheel 56 and the opposed channels 53 increases as the wheel 56 is angularly adjusted to move towards its $M_{SU}$ or $M_{SD}$ limit from a central point between these limits.

The epicyclic gear assembly 40 comprises a first drive input $I_1$ defined by a first sun gear 42, a driven output defined by a second sun gear 44 and at least one planetary gear 45 in mesh with both the first and second sun gears 42, 44 respectively. The planetary gear(s) 45 is(are) rotatably mounted on a planetary carrier defined by the driven housing disc 52 of the variator 50. The disc 52 defines a second drive input $I_2$ for the epicyclic gear assembly 40.

The second sun gear 44 is drivingly coupled with the rotary driven output 30. For example, as shown in FIG. 1, the rotary drive output 30 is defined by a sleeve 32 on which gear teeth are formed for defining the second sun gear 44. Preferably, a bearing 141 is provided for providing rotational support for the sleeve 32.

As indicated above, the epicyclic gear assembly 40 is rotatably driven by two drive inputs $I_1$, $I_2$ and the assembly acts to differentially combine the two drive inputs in order to rotatably drive the driven output 30.

In the embodiment of FIG. 1, the first drive input $I_1$ is defined by the sun gear 42 and the second drive input $I_2$ is defined by the driven housing disc 52 of the variator 50.

The sun gear 42 which defines the first drive input $I_1$, is directly mounted on a main drive shaft 25 so as to rotate in unison therewith.

The sun gear 42 is mounted on splines (not shown) formed on the main drive shaft 25 and is axially displaceable relative to the drive shaft 25.

The enlarged section 25a of main drive shaft 25 defines an axial abutment stop 24 which abuttingly engages the housing disc 51. The abutment stop 24 is urged into axial abutment with the housing disc 51 by a shaft adjustment means 80, preferably in the form of a threaded nut 81 screw threadedly received on a screw thread 82 formed at one end of the main shaft 25.

Located between nut 81 and sun gear 42 is a thrust bearing 90 and washer 91. Accordingly, tightening of the nut 81 causes the housing discs 51, 52 to be urged axially toward one another via a compressive force applied via, on the one hand, thrust bearings 26, 90 and sun gear 42 and via, on the other hand, axial abutment stop 24.

This enables a predetermined amount of compressive force to be applied by the discs 51, 52 onto wheels 56 in order to ensure transmission of rotary power or torque without slippage. Application of the predetermined compressive force is conveniently achieved by manipulation of the nut 81 at one end of the shaft 25 and does not affect the epicyclic gear assembly since sun gear 42 is axially displaceable on shaft 25.

It will be appreciated that removal of nut 81 enables the sun gear 44 to be axially withdrawn, the thrust bearing 90 to be withdrawn, the planetary gear(s) 45 to be withdrawn and sun gear 42 to be withdrawn. In other words, the gear components of the epicyclic gear assembly 40 can be easily removed and replaced by gears of different diametric sizes in order to change the gearing ratio of the epicyclic gear assembly. It also enables disc 52 to be removed to permit easy removal of the frame 55 and wheel 56 assembly.

Instead of using a nut 81 to apply a compressive force, it is envisaged that alternative means may be used, for example a hydraulic piston which would enable a variable compressive force to be applied during operation of the transmission.

This enables the variable drive transmission shown in FIG. 1 to be easily tailored to suit a particular application.

It will be appreciated that since the second drive input $I_2$ to the epicyclic gear assembly is defined by the housing disc 52 of the variator 50, the variable drive transmission of FIG. 1 is relatively compact compared to variable transmissions of the type disclosed in FR2807811.

In the embodiment of FIG. 1, the planetary gears 45 are rotatably received on stub shafts 49 projecting from the outer axial face 60 of the housing disc 52. Thus housing disc 52 defines the planetary carrier for planetary gear 45.

Preferably the planetary gears 45 are stepped gears as this provides for a greater choice in gear ratios.

As illustrated in FIG. 1a, the driven sun gear 44 is driven by the planetary gear(s) 45. The planetary gear(s) 45 is rotatably driven about stub shaft 49 by the drive sun gear 42.

In FIG. 1a, sun gear 42 is illustrated as rotating in a clockwise direction. Accordingly, the sun gear 42 acts to rotate the planetary gear 45 in an anti-clockwise direction at a speed of rotation (speed A) dependent upon the gear ratio between sun gear 42 and the planetary gear 45.

The planetary gear 45 is also driven by the planetary carrier (disc 52) in an anti-clockwise direction due to it being caused to orbit the sun gear 42 in an anti-clockwise direction. This has the effect of increasing the speed of rotation of the planetary gear 45 by an additional speed (speed B) such that the resultant speed of rotation of the planetary gear is a combination of speed A+speed B.

The orbital movement of planetary gear 45 in the anti-clockwise direction acts to impart an anti-clockwise rotation on the sun gear 44 at a speed (speed C) which is dependent upon the orbital speed of planetary gear 42 (i.e. speed of rotation of housing disc 52).

This is contrary to the direction of rotation which the rotational movement of planetary gear 42 attempts to rotate the sun gear 44, i.e. the planetary gear 42 attempts to rotate the sun gear in the clockwise direction.

Accordingly, if the combined rotational speed (speed A+speed B) of the planetary gear 42 exceeds the orbit speed (speed C), the sun gear 44 will be caused to rotate in a clockwise direction at a speed which is proportional to the difference between the rotational speed of the planetary gear 42 and its orbital speed.

Conversely, if the orbital speed (speed C) exceeds the combined rotational speed (speed A+speed B) then the sun gear 44 will be caused to rotate in an anti-clockwise direction at a speed which is proportional to the difference between the planetary gears' rotational and orbital speeds. If the orbital speed and rotational speed of the planetary gear 42 are equal, then the sun gear 44 will not be rotationally driven and will remain static, i.e. a neutral condition will prevail.

Accordingly, it will be appreciated that the planetary gear 45 rotatably drives the sun gear 44 in either an anti-clockwise or clockwise direction or does not impart a rotatable drive to the sun gear 44 (neutral condition) in dependence upon the relative speed of rotation of the sun gear 42 and disc 52.

It is envisaged that the construction of the epicyclic gear assembly 40 may be varied in order to provide different drive transmission paths through the epicyclic gear assembly 40 and so provide different drive/torque transmission characteristics for driving the load.

Figure 2:
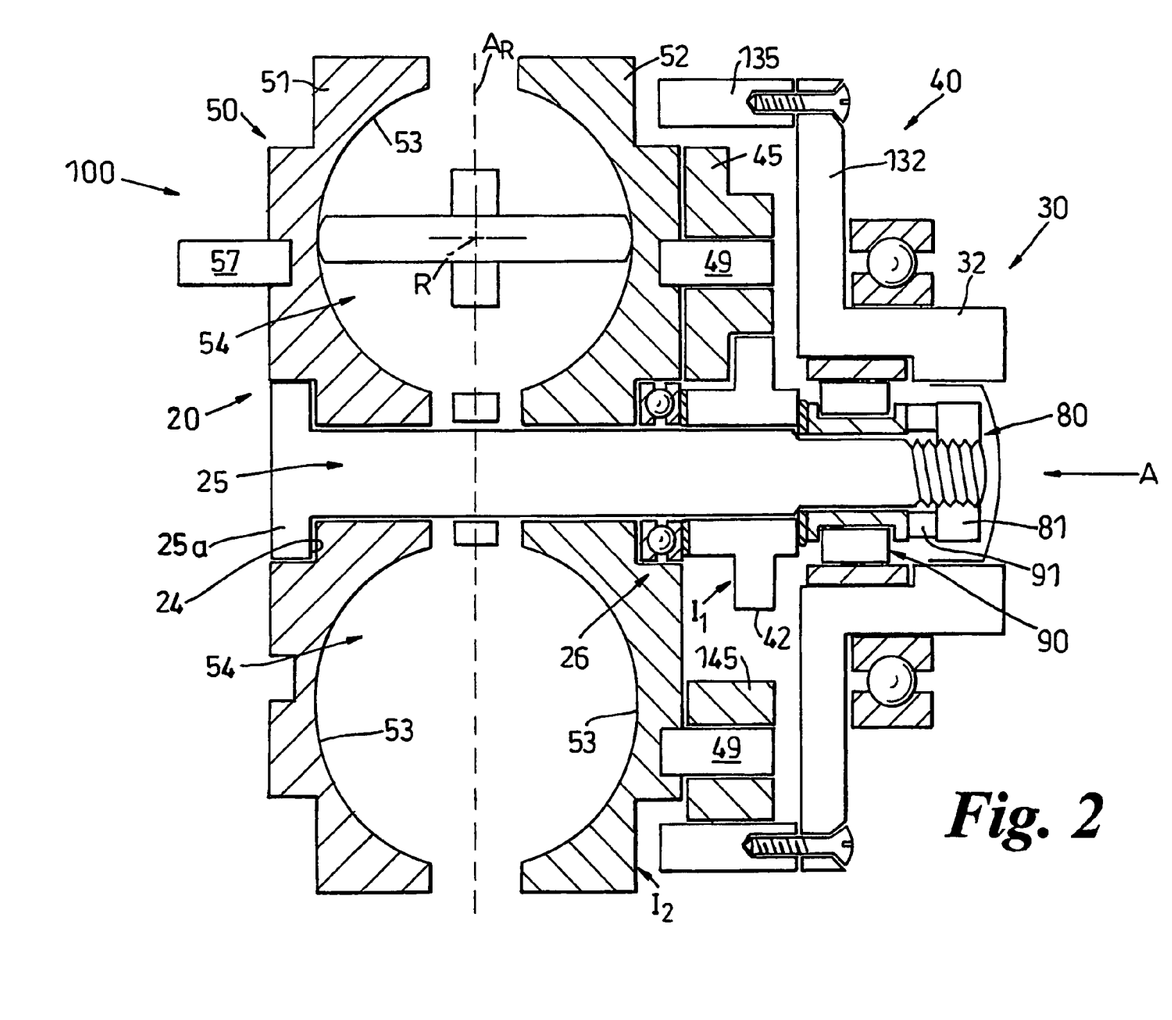
FIG. 2 is a schematic axial section through a variable transmission according to a second embodiment of the present invention.
Figure 2A:
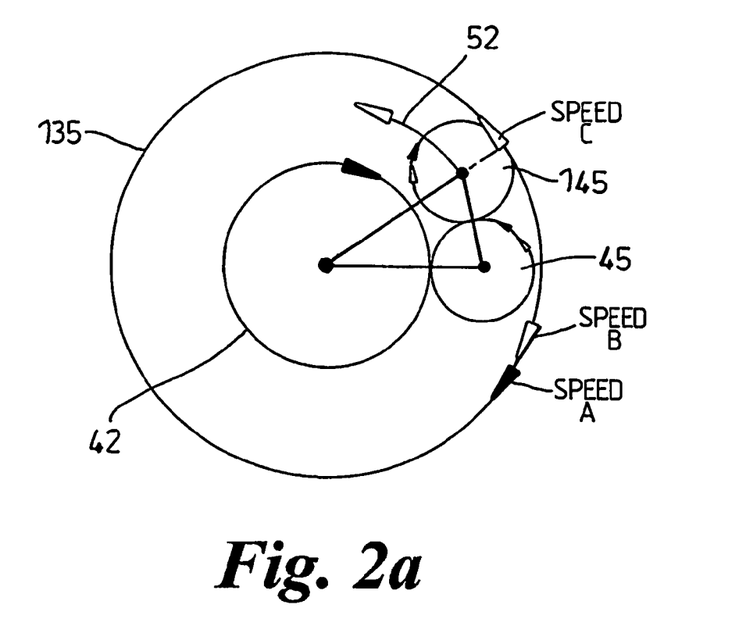
FIG. 2a is a schematic axial end view of the embodiment of FIG. 2 as viewed from arrow A.
Figure 3:
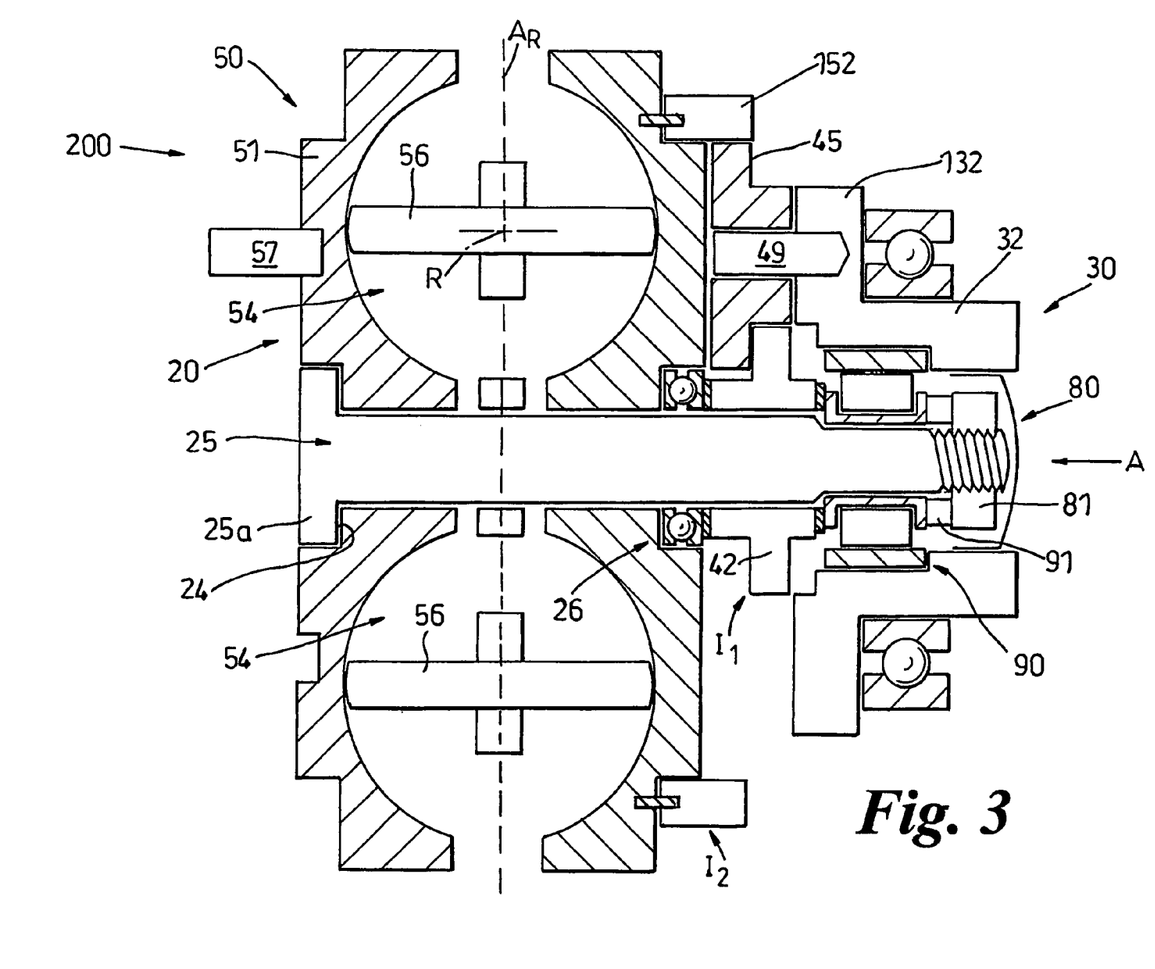
FIG. 3 is a schematic axial section through a variable transmission according to a third embodiment of the present invention.
Figure 4:
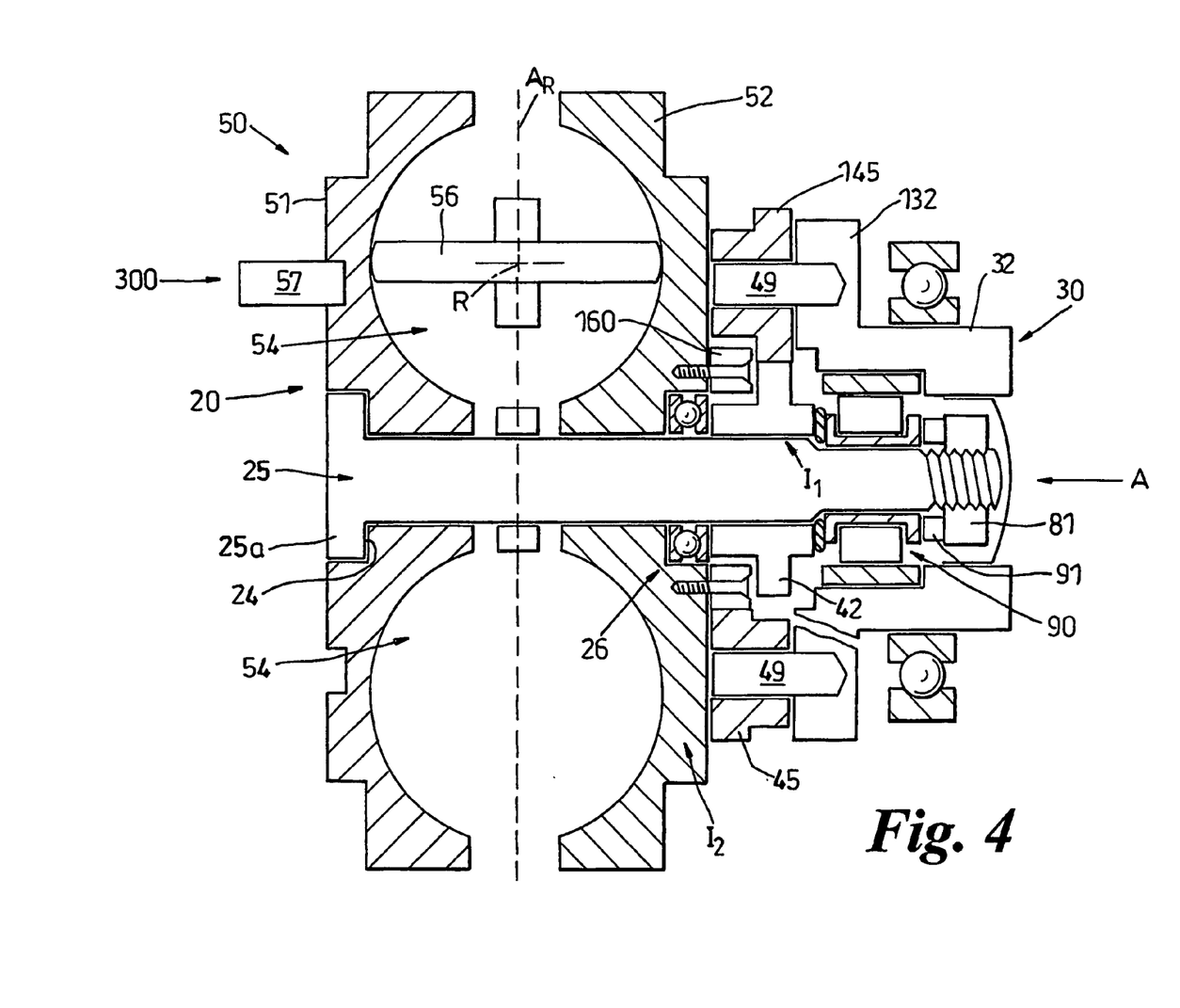
FIG. 4 is a schematic axial section through a variable transmission according to a fourth embodiment of the present invention.
Figure 4A:
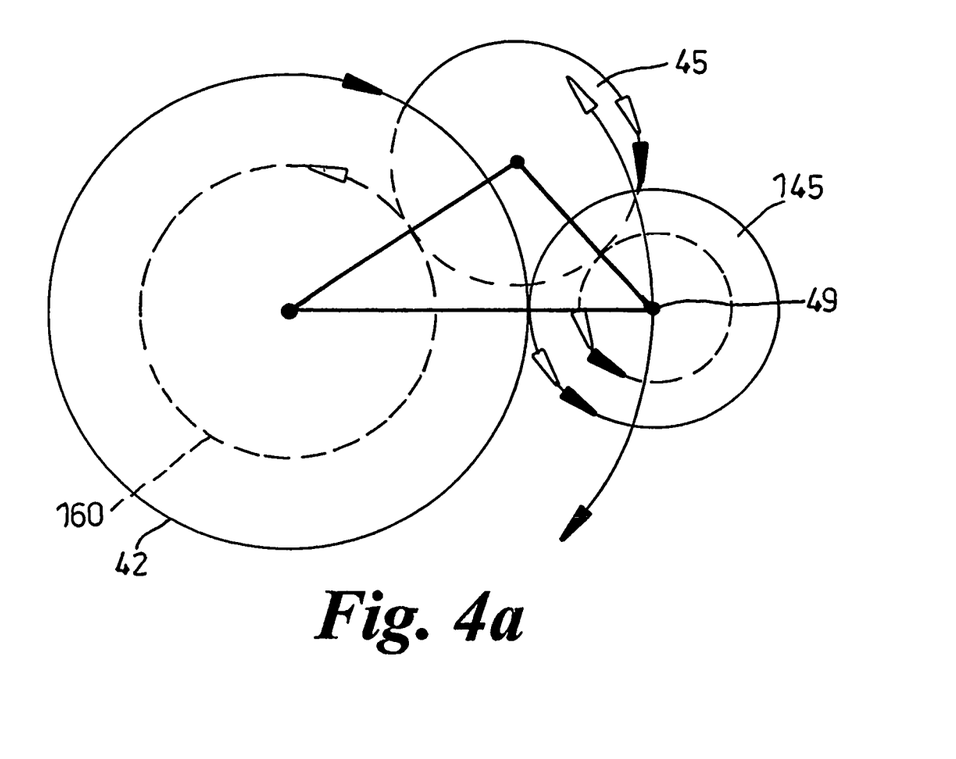
FIG. 4a is a schematic axial end view of the embodiment of FIG. 4 as viewed from arrow A.

Examples of different epicyclic gear assembly constructions are illustrated in FIGS. 2 to 4 wherein components similar to those in the gear assembly 40 of FIG. 1 are designated by the same reference numerals.

In the embodiment 100 illustrated in FIG. 2, the rotary drive output 30 is defined by a sleeve 32 having a radial flange 132 on which is mounted an internally toothed ring gear 135.

In embodiment 100 each planetary gear 45 is carried by the housing disc 52 via a stub shaft 49 and is in driving connection with the ring gear 135 via an idler planetary gear 145. Each idler gear 145 is rotatably mounted on the housing disc 52 via a stub shaft 146.

The embodiment 100 of FIG. 2 functions in a similar manner to embodiment 10 in that the direction of rotation of the ring gear 135 is dictated by the difference between the peripheral speed (speed C) which the orbital motion of the idler gear 145 imparts onto ring gear 135 and the peripheral speed (speed A+speed B) which the rotational motion of the idler gear 145 imparts onto ring gear 135.

In the embodiment 200 illustrated in FIG. 3 the radial flange 132 of the rotary drive output 30 defines a planetary carrier upon which the planetary gear(s) 45 are rotatably mounted via stub shaft(s) 49.

An internally toothed ring gear 152 is mounted on the housing disc 52 and is arranged to mesh with the or each planetary gear 45. The or each planetary gear 45 is, in turn, in mesh with the sun gear 42.

Figure 3A:
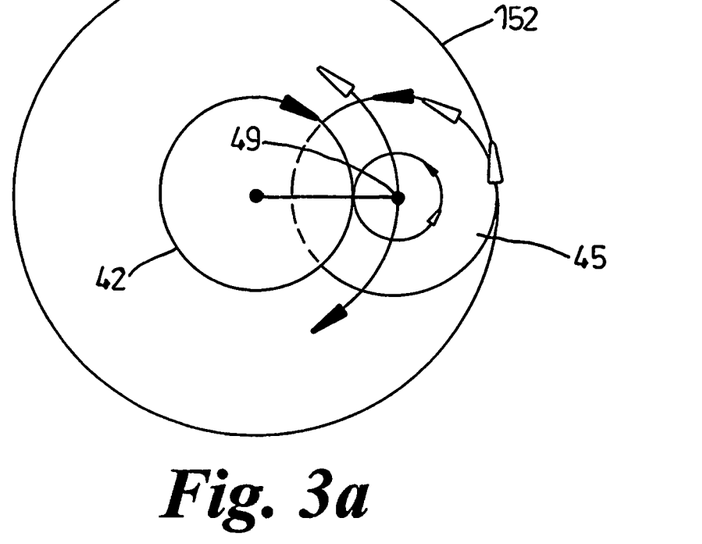
FIG. 3a is a schematic axial end view of the embodiment of FIG. 3 as viewed from arrow A.

Accordingly, as illustrated in FIG. 3a, the anti-clockwise rotating ring gear 152 ($I_2$) acts to rotate each planetary gear 45 in an anti-clockwise direction and the clockwise rotating sun gear 42 ($I_1$) also acts to rotate each planetary gear 45 in an anti-clockwise direction. If the peripheral speed at the interface between, on the one hand, the ring gear 152 and planetary gear 45 exactly matches, on the other hand, the peripheral speed at the interface between the planetary gear 45 and sun gear 42 then the stub shaft 49 will remain stationary and a 'neutral' drive condition will prevail, i.e. the drive output 30 will remain stationary.

If the peripheral speed of the planetary gear 45 exceeds that of the sun gear 42 (as brought about by the ring gear 152 ($I_2$)) then the stub shaft 49 will be caused to orbit the sun gear 42 in an anti-clockwise direction and so cause the rotary output 30 to rotate in an anti-clockwise direction and at a speed which is proportional to the difference in peripheral speeds between the sun gear 42 and planetary gear 45. Conversely, if the peripheral speed of the planetary gear 45 is greater than that of the ring gear 152 (as brought about by a decrease in the speed of rotation of the ring gear 152 ($I_2$)), then the stub shaft 49 will be caused to orbit the sun gear 42 in a clockwise direction and so cause the rotary output 30 to rotate in a clockwise direction and at a speed which is proportional to the difference in peripheral speeds between the ring gear 152 and planetary gear 45.

The embodiment 300 illustrated in FIG. 4 is similar to embodiment 200 in that the radial flange 132 defines a planetary carrier. In embodiment 300, an externally toothed ring gear 160 is mounted on the housing disc 52 and meshes with each planetary gear 45. Each planetary gear 45 drivingly meshes with sun gear 42 via an idler planetary gear 145.

Operation of embodiment 300 is the same as that of embodiment 200 in that the rotary output 30 will be caused to rotate in the anti-clockwise direction in the event that the peripheral speed of the idler planetary gear 145 is greater than the peripheral speed of sun gear 42 and is rotated in the clockwise direction in the event that the peripheral speed of the planetary gear 45 is greater than the peripheral speed of the ring gear 160.

In the above embodiments of FIGS. 1 to 4, the first input drive $I_1$ is defined by a sun gear 42. However, as illustrated by way of example in the embodiments shown in FIGS. 6 and 7, it is envisaged that the first input drive $I_1$ may instead by defined by a planetary carrier 432.

Figure 6:
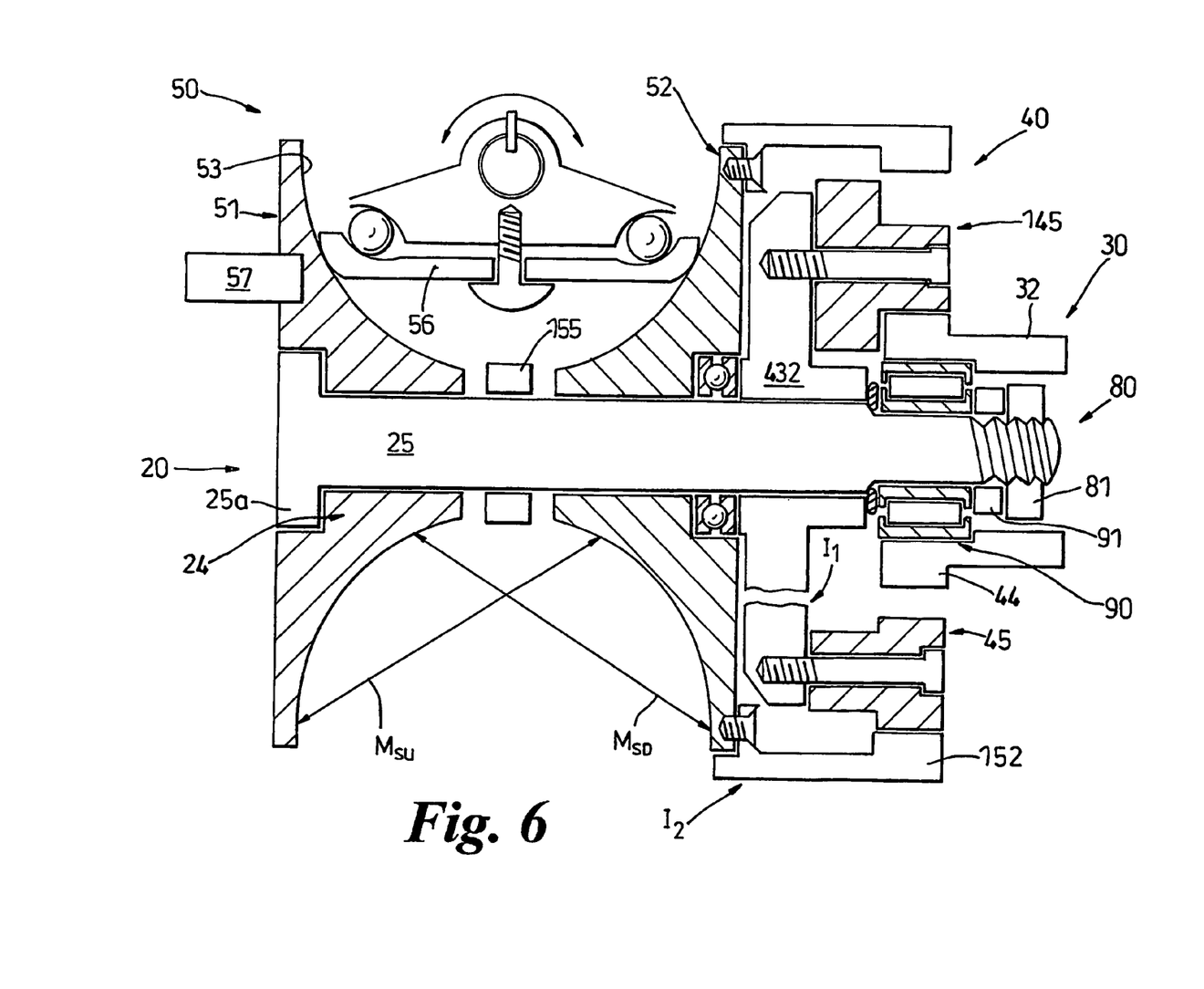
FIGS. 6 and 7 are schematic axial sections of transmissions that have a planetary carrier.

In the fifth embodiment 400, parts similar to those in the previous embodiments have been designated by the same reference numerals. The epicyclic gear assembly 40 includes a planetary carrier 432 which carries at least one pair of planetary gears 45, 145. The planetary carrier 432 is mounted on shaft 25 so as to be rotatable in unison therewith but is preferably axially movable thereon to thereby enable an axial loading to be applied by the shaft adjustment means 80 onto discs 51, 52.

Planetary gear 45 of each pair of planetary gears is in mesh with ring gear 152 mounted on disc 52 and planetary gear 145 is in mesh with sun gear 44 on sleeve 32.

Figure 7:
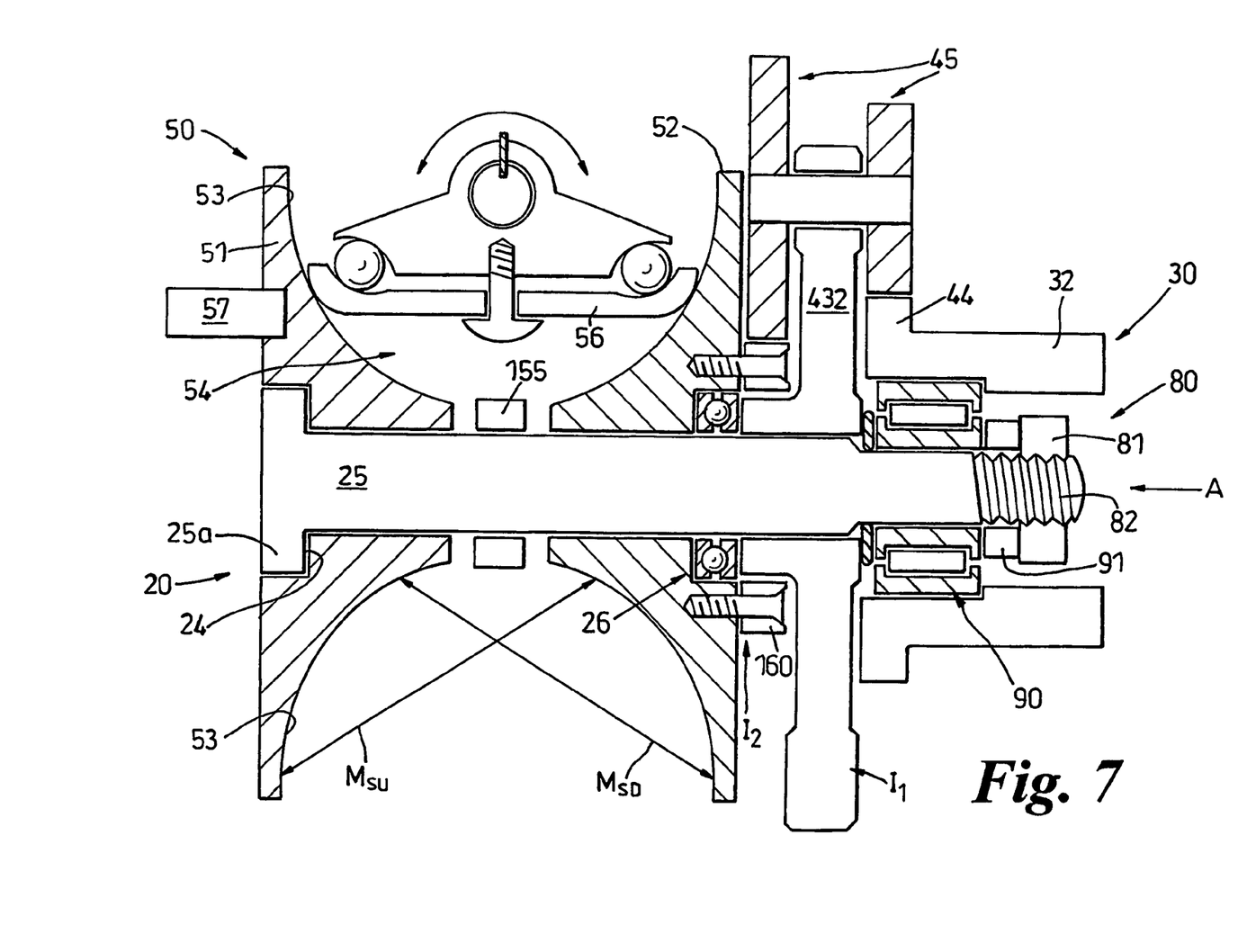

The embodiment 500 shown in FIG. 7 differs from embodiment 400 in that in embodiment 500, planetary gear 45 is in mesh with an externally toothed ring gear 160 and also with the sun gear 44 i.e. intermediate planetary gear 145 has been omitted.

Figure 6A:
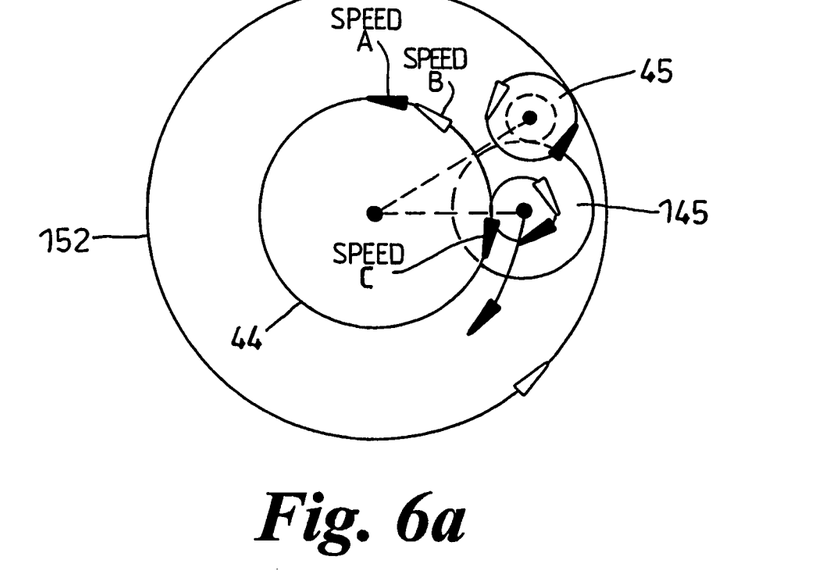
FIGS. 6a and 7a are schematic axial end views of the embodiments of FIGS. 6 and 7.
Figure 7A:
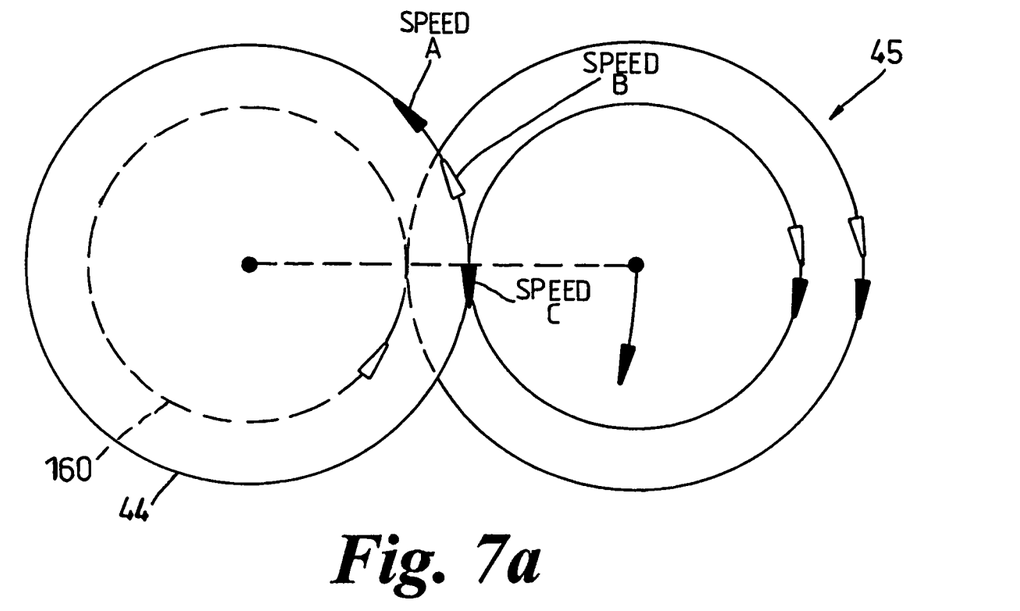

Operation of embodiments 400 and 500 is similar to that for the previous embodiments illustrated in FIGS. 1 to 4. In summary, as illustrated in FIGS. 6a and 7a, the planetary gear 45 is caused to undergo rotation about its axis caused by the combination of two drive sources, viz. a rotary speed A caused by rotation of the planetary carrier and rotary speed B caused by rotation of the ring gear 152 or 160. These rotary speeds A, B act in the same direction to drive the sun gear 44 in an anti-clockwise direction (when shaft 25 is rotating in a clockwise direction).

The planetary carrier 432 rotates in a clockwise direction and so moves the planetary gears 45, 145 in a clockwise orbit around the sun gear 44 and so attempts to drive the sun gear 44 in the clockwise direction at a speed C.

As in the earlier embodiments of FIGS. 1 and 2, it will be seen therefrom that the direction of rotation and speed of rotation of the output 30 will be dependent upon the difference between the combined speeds (A+B) and that of speed C.

In the embodiments described with reference to FIGS. 1 to 4, the channels 53 of the variator 50 are shown as being semi-circular in circumferential extent. It is envisaged that channels 53 may instead have a shorter circumferential extent, such as for example a quarter of a circle. This is illustrated, by way of example, in the embodiments 400, 500 of FIGS. 6 and 7 respectively.

Figure 8:
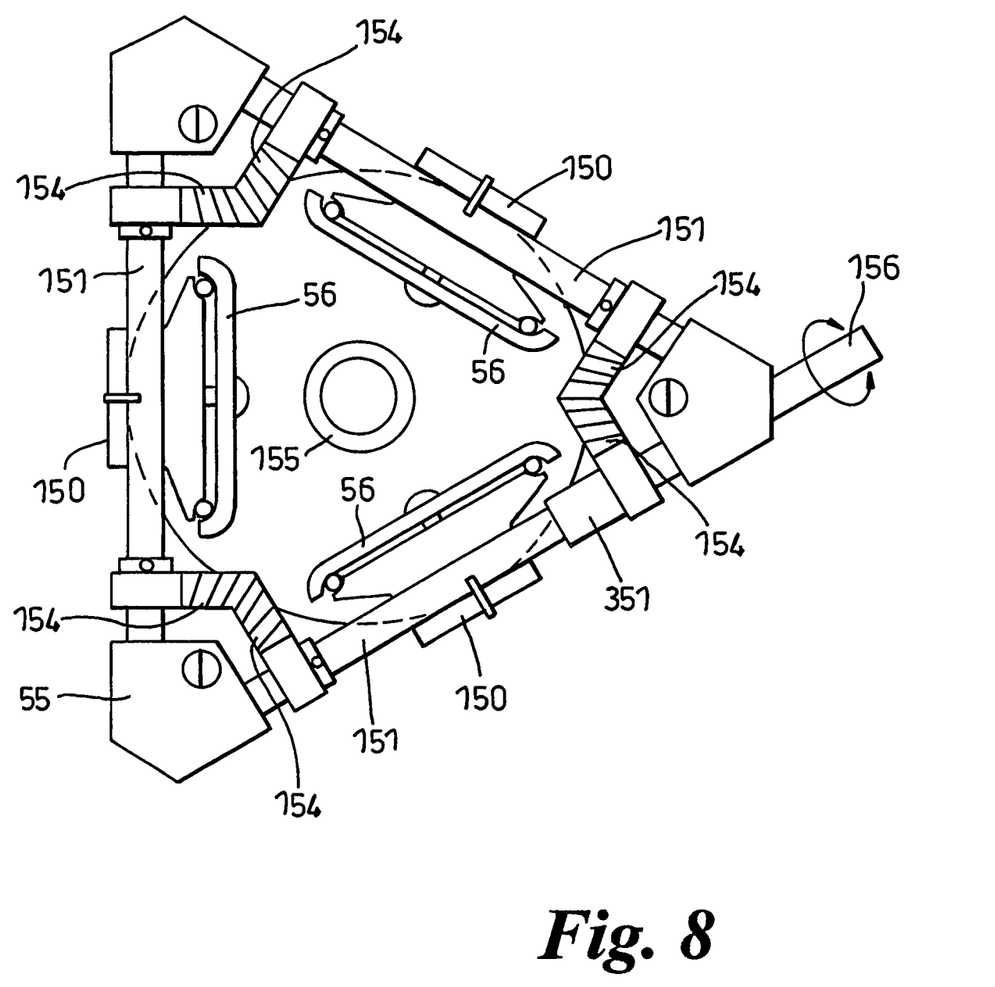
FIG. 8 is a schematic view of a wheel assembly.

A modified wheel assembly WA for transmitting drive between the discs 51, 52 is illustrated in FIG. 8. Parts similar to those illustrated in the earlier drawings are designated by the same reference numerals.

The invention claimed is:

1. A rotary drive transmission having a rotary drive input and a rotary driven output; the drive transmission being capable of selectively varying the drive ratio between the rotary drive input and rotary driven output, the drive transmission including:
    a main drive shaft, wherein the main drive shaft is the rotary drive input of the rotary drive transmission;
    a differential transmission assembly comprising an epicyclic gear assembly having a rotary output member which is the rotary driven output of the rotary drive transmission, the epicyclic gear assembly further including a first rotary drive input mounted on the main drive shaft and directly driven thereby, a separate second rotary drive input, and a rotatable sleeve, the first and second rotary drive inputs and said rotary output member being drivingly interconnected with one another such that changes in the relative rotation of the first and second rotary drive inputs cause a rotational change in said rotary output member, and wherein the rotary driven output of the rotary drive transmission includes the rotatable sleeve of the epicyclic gear assembly, and wherein the rotary drive transmission includes a sleeve bearing that is slidably mounted on the main drive shaft, and wherein the sleeve is rotatably mounted on the sleeve bearing; and
    selectively operable rotary adjustment means for adjusting the rotation of the second rotary drive input for selectively controlling rotation of the rotary output member, the selectively operable rotary adjustment means comprising a variator having a drive rotary disc axially opposed to a driven rotary disc, and wherein the variator includes a transmission wheel assembly located between the drive and driven rotary discs, the opposed rotary discs defining an annular chamber or partial section thereof therebetween in which one or more transmission wheels are located for transmitting rotary drive from the drive rotary disc to the driven rotary disc, the drive rotary disc being mounted on the main drive shaft for rotation in unison therewith and the driven rotary disc being mounted on the main drive shaft for rotational movement relative thereto, wherein the driven rotary disc is also the second rotary drive input of the epicyclic gear assembly,
    wherein the rotary drive transmission includes a thrust bearing, and wherein the main drive shaft has a first end and a second end, and wherein the drive rotary disc, the driven rotary disc, the thrust bearing, the first rotary drive input, and the sleeve bearing are slidably mounted on the main drive shaft so as to enable the rotary drive transmission to be assembled and disassembled by insertion from the second end, and wherein the rotary drive transmission includes a shaft adjustment means for adjustably urging the driven rotary disc towards the drive rotary disc in an axial direction relative to the main drive shaft, and for maintaining the drive rotary disc, the transmission wheel assembly, the driven rotary disc, the first rotary drive input, and the sleeve bearing assembled together, the shaft adjustment means being located at the second end of the main drive shaft.

2. A transmission according to claim 1 wherein the epicyclic gear assembly includes a drive sun gear mounted on the main drive shaft so as to be rotatable in unison therewith, wherein the drive sun gear is the first rotary drive input of the epicyclic gear assembly.

3. A transmission according to claim 2 wherein the driven rotary disc of the variator is a planetary carrier upon which one or more planetary gears are mounted in meshing engagement with said drive sun gear.

4. A transmission according to claim 3, the sleeve having mounted thereon a driven gear in meshing engagement with said one or more planetary gears.

5. A transmission according to claim 2 wherein the rotary output member comprises the sleeve, the sleeve having a planetary carrier upon which one or more planetary gears are mounted in meshing engagement with the drive sun gear, the driven disc of the variator having a gear in meshing engagement with said one or more planetary gears.

6. A transmission according to claim 2 wherein the driven rotary disc of the variator and the drive sun gear of the epicyclic gear assembly are axially movable on the main drive shaft, the main drive shaft having adjustable axial compression means operable to urge the drive sun gear axially towards the drive rotary disc of the variator and to thereby urge the driven rotary disc of the variator axially towards the drive rotary disc of the variator, and wherein adjustment of the shaft adjustment means at the second end of the main drive shaft causes the driven rotary disc of the variator to be urged towards the drive rotary disc of the variator, and thereby adjusts the axial position of the driven rotary disc relative to the main drive shaft.

7. A transmission according to claim 6 wherein the axial compression means is located at a terminal end of the main drive shaft and is removed to enable disassembly of the epicyclic gear assembly.

8. A transmission according to claim 7 wherein the axial compression means comprises a nut screw threadedly received on said main drive shaft.

9. A transmission according to claim 1 wherein the epicyclic gear assembly includes a planetary carrier mounted on the main drive shaft so as to be rotatable in unison therewith, the planetary carrier having one or more planetary gears mounted thereon, wherein the planetary carrier is the first rotary drive input of the epicyclic gear assembly.

\* \* \* \* \*